United States Patent
Spryshak

(10) Patent No.: US 11,884,126 B2
(45) Date of Patent: Jan. 30, 2024

(54) HVAC TEMPERATURE STRATIFICATION DOOR SYSTEMS AND METHODS

(71) Applicant: Air International (US) Inc., Auburn Hills, MI (US)

(72) Inventor: Joseph J. Spryshak, Hartland, MI (US)

(73) Assignee: Air International (US) Inc., Auburn Hills, MI (US)

( * ) Notice: Subject to any disclaimer, the term of this patent is extended or adjusted under 35 U.S.C. 154(b) by 210 days.

(21) Appl. No.: 17/377,969

(22) Filed: Jul. 16, 2021

(65) Prior Publication Data

US 2022/0016954 A1    Jan. 20, 2022

Related U.S. Application Data

(60) Provisional application No. 63/052,595, filed on Jul. 16, 2020.

(51) Int. Cl.
*B60H 1/00* (2006.01)

(52) U.S. Cl.
CPC ..... *B60H 1/00064* (2013.01); *B60H 1/00692* (2013.01); *B60H 2001/00092* (2013.01); *B60H 2001/00107* (2013.01)

(58) Field of Classification Search
CPC ............ B60H 1/00064; B60H 1/00692; B60H 2001/00092; B60H 2001/00107
USPC .......................................................... 454/69
See application file for complete search history.

(56) References Cited

U.S. PATENT DOCUMENTS

| | | | | |
|---|---|---|---|---|
| 6,811,481 B2 * | 11/2004 | Uemura | ............. | B60H 1/00692 251/901 |
| 8,113,268 B2 * | 2/2012 | Stevenson | .......... | B60H 1/00835 137/865 |
| 9,636,968 B2 * | 5/2017 | Makita | ............... | B60H 1/00021 |
| 2004/0194947 A1 * | 10/2004 | Ito | ....................... | B60H 1/00692 165/905 |
| 2009/0165991 A1 * | 7/2009 | Komaba | ............. | B60H 1/00028 165/42 |
| 2012/0085115 A1 * | 4/2012 | Kim | .................... | B60H 1/00692 62/239 |
| 2020/0307350 A1 * | 10/2020 | Akiyama | ........... | B60H 1/00857 |
| 2020/0346513 A1 * | 11/2020 | Sikorski | ............. | B60H 1/00857 |
| 2021/0178852 A1 * | 6/2021 | Kwak | ................ | B60H 1/00514 |

FOREIGN PATENT DOCUMENTS

DE    102011008520 A1 *    7/2012    .........    B60H 1/00064

\* cited by examiner

*Primary Examiner* — Avinash A Savani
*Assistant Examiner* — Dana K Tighe
(74) *Attorney, Agent, or Firm* — Carlson, Gaskey & Olds, P.C.

(57) ABSTRACT

An HVAC system includes an evaporator, a heater, a plurality of outlets, and a sliding control door downstream of the evaporator, which is configured to allow air to flow across one or both of a heated path across the heater and a bypass path bypassing the heater. A sliding stratification door is downstream of the temperature control door and positionable to, in an intermediate position, direct air flowing through the bypass path to be mixed with air that flowed across the heated path before flowing out of the plurality of outlets.

20 Claims, 7 Drawing Sheets

HVAC TEMPERATURE STRATIFICATION DOOR SYSTEMS AND METHODS

BACKGROUND

Vehicles may have a HVAC climate control system located within an instrument panel which provides conditioned air through various outlets to occupants in the vehicle cabin.

SUMMARY

An HVAC system according to an example of this disclosure includes an evaporator, a heater, a plurality of outlets, and a sliding control door downstream of the evaporator, which is configured to allow air to flow across one or both of a heated path across the heater and a bypass path bypassing the heater. A sliding stratification door is downstream of the temperature control door and positionable to, in an intermediate position, direct air flows through the bypass path to be mixed with air that flowed across the heated path before flowing out of the plurality of outlets.

In a further example of the foregoing, the air is mixed within a bypass cavity.

In a further example of any of the foregoing, in a full cold position, the stratification door is in a retracted position within an upper exit cavity to unobstruct the bypass path.

In a further example of any of the foregoing, the plurality of outlets includes a defrost outlet and an upper vent outlet, and the upper exit cavity is provided fluidly between the bypass cavity and the defrost outlet and upper vent outlet.

In a further example of any of the foregoing, when the stratification door is in the retracted position, a maximum distance between a surface of the stratification door and an interfacing inner surface of the upper exit cavity is 0-50 mm.

In a further example of any of the foregoing, in a full hot position, the control door is positioned to block the bypass path, such that airflow must flow across the heater before entering the bypass cavity.

In a further example of any of the foregoing, the stratification door includes a concave surface that faces the evaporator.

In a further example of any of the foregoing, the stratification door is a rack and pinion style sliding door.

In a further example of any of the foregoing, the control door is a rack and pinion style door.

In a further example of any of the foregoing, a pinion portion of the control door is between the evaporator and the heater.

In a further example of any of the foregoing, the pinion portion of the control door is between the heated path and the bypass path.

In a further example of any of the foregoing, the control door includes a concave surface that faces the evaporator.

In a further example of any of the foregoing, in the intermediate position, air flowing across the bypass path flows between the control door and the stratification door and toward a lower portion of a bypass cavity, where it is then mixed with air that flowed across the heated path.

In a further example of any of the foregoing, in the intermediate position, air flowing across the bypass path flows between a convex surface of the control door and a concave surface of the stratification door and toward a lower portion of a bypass cavity, where it is then mixed with air that flowed across the heated path.

An HVAC system according to an example of this disclosure includes an evaporator, a heater, a plurality of outlets, a sliding control door downstream of the evaporator and configured to allow air to flow across one or both of a heated path across the heater and a bypass path bypassing the heater. A sliding stratification door is downstream of the temperature control door and positionable to, in an intermediate position, direct air flows through the bypass path to be mixed within a bypass cavity with air that flowed across the heated path before flowing out of the plurality of outlets. In a full cold position, the stratification door is in a retracted position within an upper exit cavity to unobstruct the bypass path. The plurality of outlets include a defrost outlet and an upper vent outlet. The upper exit cavity is provided fluidly between the bypass cavity and the defrost outlet and upper vent outlet. When the stratification door is in the retracted position, a maximum distance between a surface of the stratification door and an interfacing inner surface of the upper exit cavity is 0-50 mm. In the intermediate position, air flowing across the bypass path flows between a convex surface of the control door and a concave surface of the stratification door and toward a lower portion of a bypass cavity, where it is then mixed with air that flowed across the heated path.

In a further example of the foregoing, the stratification door is a rack and pinion style sliding door.

In a further example of any of the foregoing, the control door is a rack and pinion style door.

In a further example of any of the foregoing, a pinion portion of the control door is between the evaporator and the heater.

In a further example of any of the foregoing, the pinion portion of the control door is between the heated path and the bypass path.

In a further example of any of the foregoing, the control door includes a concave surface that faces the evaporator.

DETAILED DESCRIPTION

This disclosure relates generally to HVAC systems for vehicles, and particularly to systems and methods for achieving desirable outlet temperatures for one outlet relative to another.

Figure 1:
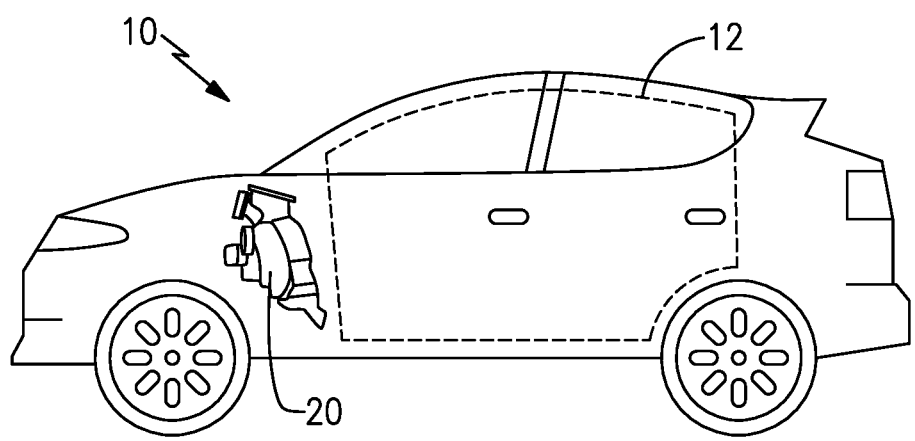
FIG. 1 schematically illustrates a vehicle with an example HVAC system.

FIG. 1 schematically illustrates a vehicle 10 including an example HVAC system 20 for providing conditioned air to a vehicle cabin 12. In some examples, the vehicle 10 may include any of automobiles, heavy trucks, agricultural vehicles, or commercial vehicles.

Figure 2A:
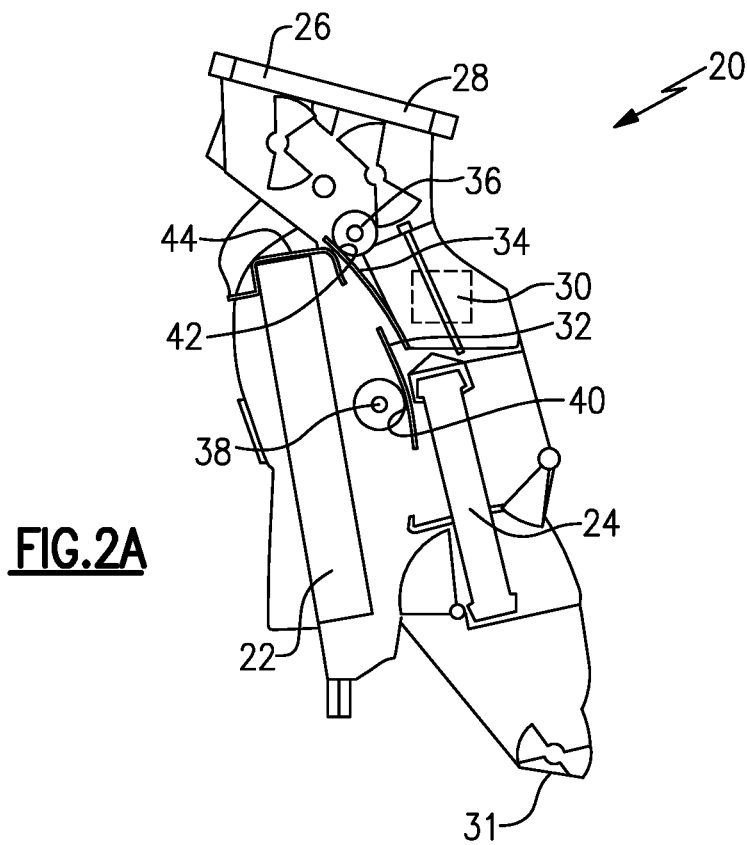
FIG. 2A illustrates a cross sectional view of the example HVAC system shown in FIG. 1.

FIG. 2A schematically illustrates a cross section of the example HVAC system 20 of FIG. 1. Air may enter the HVAC system 20 and flow across the evaporator 22 (in primarily a left to right direction with regard to the orientation shown), before flowing across or bypassing the heater 24. Once conditioned, such as by heating or cooling or dehumidifying, the air may exit the system 20 through various outlets 26, 28, 30 for entry into the vehicle cabin 12 (see FIG. 1). In some examples, the outlet 26 corresponds to a defrost vent, the outlet 28 corresponds to an upper front vent, and the outlet 30 corresponds to a floor front vent in the vehicle cabin 12. In some examples, additional outlets 31, which may correspond to second row vents, may be provided.

A sliding temperature control door 32 is positionable to control the flow across the heater 24 and bypassing the heater 24, such as in response to temperature settings desired by a user in the vehicle cabin 12. In some examples, as shown, the temperature control door 32 is a rack and pinion style door. A sliding temperature stratification door 34 is provided generally above the temperature control door 32. In some examples, as shown, the stratification door 34 is a rack and pinion style door, and the pinion portion 36 of the temperature stratification door 34 is generally above the pinion portion 38 of the temperature control door 32 with respect to the orientation shown in FIG. 1. In the example shown, the pinion portion 36 is provided between the temperature control door 32 and the outlets 26, 28. In some examples, as shown, the pinion portion 38 is provided adjacent an upper end of the heater 24 and between the heater 24 and the evaporator 22, and the rack portion 40 of the temperature control door 32 is between the pinion 38 and the heater 24. The rack portion 42 of the temperature stratification door 34 may be between the pinion 36 and an upper wall 44 in some examples, as shown.

Figure 2B:
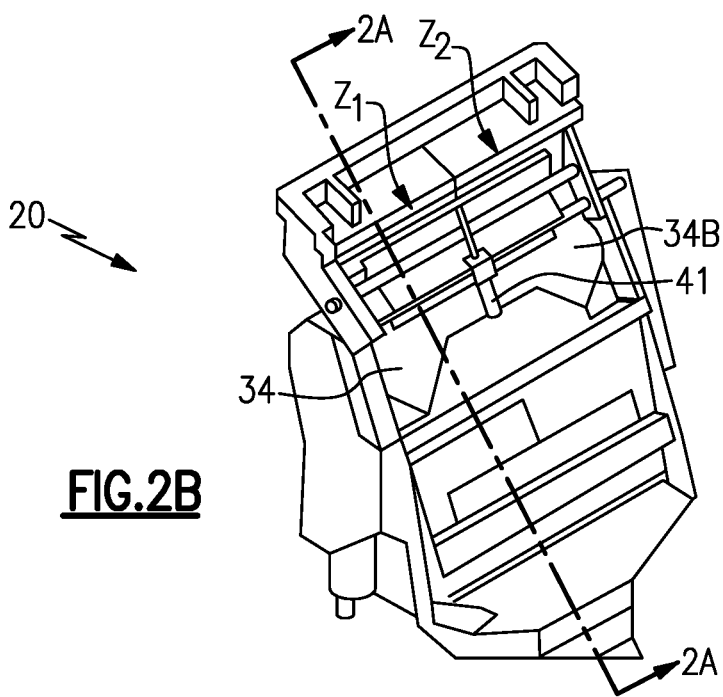
FIG. 2B illustrates an isometric view of the example HVAC system of FIGS. 1 and 2A.

FIG. 2B illustrates an alternate sectional view of the example HVAC system 20, with reference for the cross section shown in FIG. 2A. While the description of FIG. 2A refers to components shown at the cross section, in some examples, as shown, the system 20 includes two zones Z1 and Z2 separated by a separation wall 41 as shown in FIG. 2B. In some examples, the two zones Z1 and Z2 correspond to a driver's side zone and a passenger side zone, respectively, and have the same or similar components. That is, zone Z2 may have the equivalent components to those shown at the cross section of Z1. For example, in some examples, as shown, zone Z2 has its own independently controllable stratification door 34B and temperature control door 32B (not shown). Having separate, independently controllable zones Z1, Z2 can allow for independent temperature control by occupants at the driver and passenger sides of the vehicle.

Figure 3A:
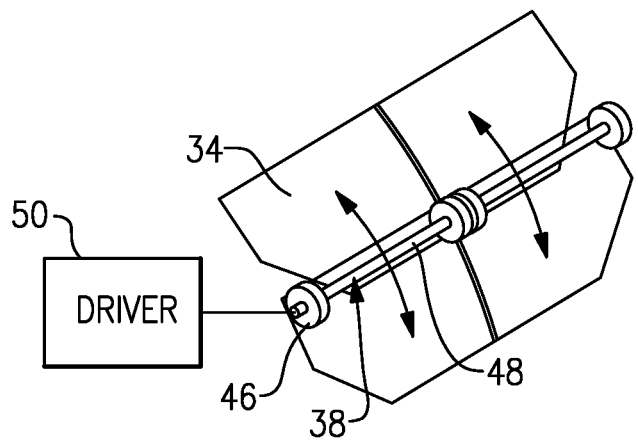
FIG. 3A schematically illustrates the range of motion for the opened and closed position of the example stratification door of the HVAC system in FIGS. 2A and 2B.

FIG. 3A schematically illustrates the range of motion for the retracted and extended position of the example stratification door 34 of FIGS. 2A and 2B. The pinion portion 38 includes one or more pinions 46 rotatable with a shaft 48 to engage a rack portion of the door 34. The stratification door 34 is driven by a rack & pinion motion actuator 50 (shown schematically). The example pinions 46 are located on the downstream side (relative to the flow from the evaporator 22 toward the outlets 26, 28, 30 in FIG. 2A) of the stratification door 34. In other examples, the pinions 46 may be located on the upstream side of the stratification door 34.

Figure 3B:
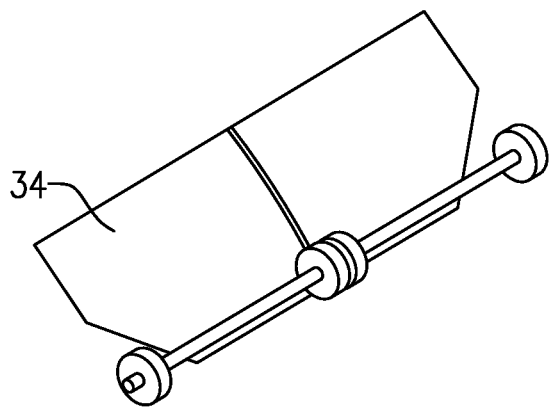
FIG. 3B illustrates a full retracted position of the example stratification door with respect to the orientation shown in FIGS. 2A-3A.

FIG. 3B illustrates a full retracted position of the example stratification door 34 with respect to the orientation shown in FIG. 2A.

Figure 3C:
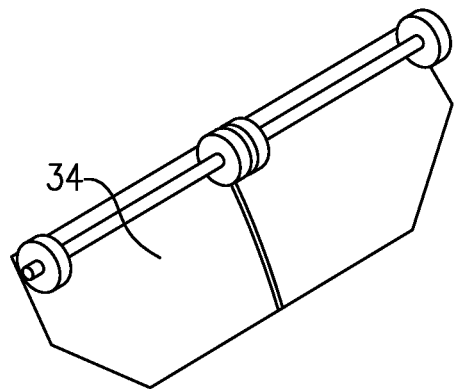
FIG. 3C illustrates a full extended position of the example stratification door with respect to the orientation shown in FIGS. 2A-3A.

FIG. 3C illustrates a full extended position of the example stratification door 34 with respect to the orientation shown in FIG. 2A.

Figure 4:
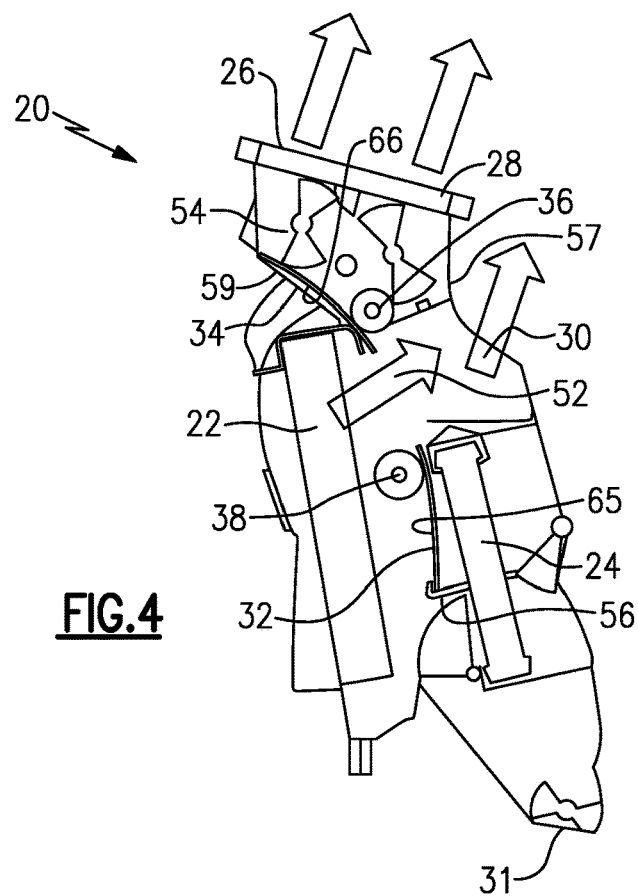
FIG. 4 schematically illustrates the example HVAC system in a full cool position.

FIG. 4 schematically illustrates the example HVAC system 20 in a full cool position. The stratification door 34 is positioned in the retracted position shown in FIG. 3B. The temperature control door 32 is positioned to block flow exiting the evaporator 22 from flowing across the heater 24. The air that flows across evaporator 22 therefore flows through a bypass path 52 and out the outlets 26, 28, 30, as shown schematically. Therefore, with regard to the vehicle cabin 12 (not shown), cool air flows through the vents associated with the outlets 26, 28, 30. The airflow through the bypass path 52 exits through the outlet 30, as well as flowing between the pinion portion 36 and a back wall 57 and out the outlets 26, 28.

Figure 10:
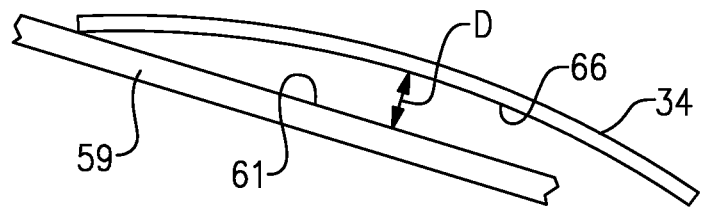
FIG. 10 illustrates an example stratification door and upper exit cavity wall of the system of the example HVAC system of FIG. 6.

Still referring to FIG. 4, when the temperature stratification door 34 is in the retracted position, it is positioned within an upper exit cavity 54 fluidly adjacent the outlets 26, 28. As such, no additional packaging space is needed to accommodate the temperature stratification door 34. In the example shown, when the temperature stratification door 34 is in the retracted position, the door 34 is positioned against or in close proximity to a wall 59 of the exit cavity 54. In some examples, as shown in FIG. 10, a maximum distance between the surface 66 of the stratification door 34 in the retracted position and the inner surface 61 of the wall 59 is a distance D of 0-50 mm, such that the door 34 does not require significant additional packaging space and minimally affects airflow. Referring back to FIG. 4, in this example at this setting, the temperature control door 32 is received against a divider wall 56 that separates flow intended for outlets 26, 28, 30 from flow intended for the one or more outlets 31. Of course, other configurations, including those without the one or more outlets 31, are contemplated. In some examples, as shown, the respective concave surfaces 65, 66 of the control door 32 and stratification door 34 face the evaporator 22 in this position.

Figure 5:
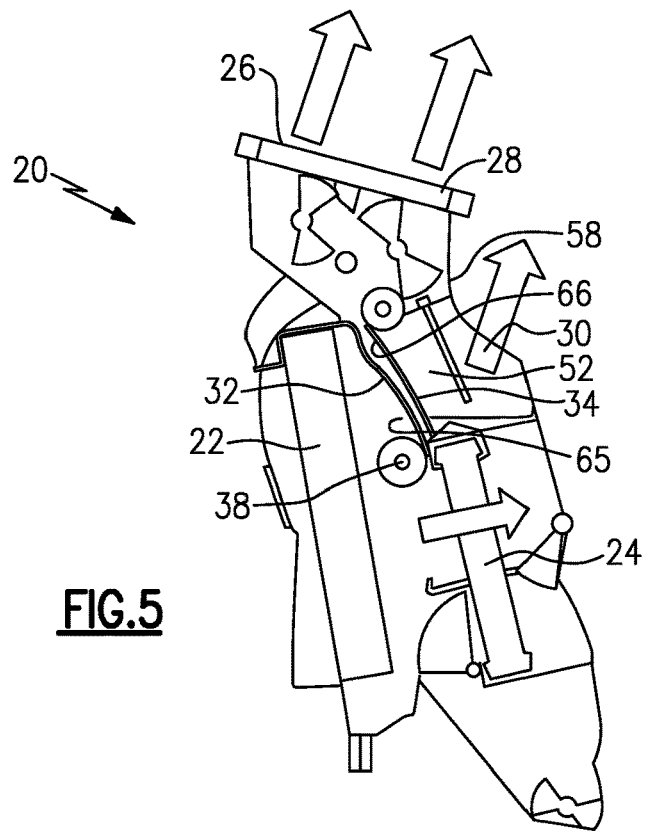
FIG. 5 schematically illustrates the example HVAC system in a full hot position.

FIG. 5 illustrates the example HVAC system 20 in a full hot position. The control door 32 and the stratification door 34 are positioned to allow all airflow to flow across the heater 24. The control door 32 blocks the bypass path 52. The stratification door 34 may be in the position shown in FIG. 3B or FIG. 3C. In the position shown, the control door 32 and the stratification door 34 are nested with their respective concave surfaces facing the evaporator 22. Air flows across the evaporator 22 and then along a heated path 58 across the heater 24 before flowing out of the outlets 26, 28, 30. The heated air exits through the outlet 30, as well as flowing between the pinion portion 36 and a front wall 58 and out the outlets 26, 28.

As shown in FIGS. 4 and 5, the stratification door 34 does not increase air restriction in full cold or full hot scenarios. The stratification door 34 moves out of the air flow path when not needed, instead of staying in the airflow path and creating airflow restrictions (avoiding more noise and more electrical power). In some examples, as shown, the pinion portion 38 is provided between the bypass path 52 and the heated path 58.

Figure 6:
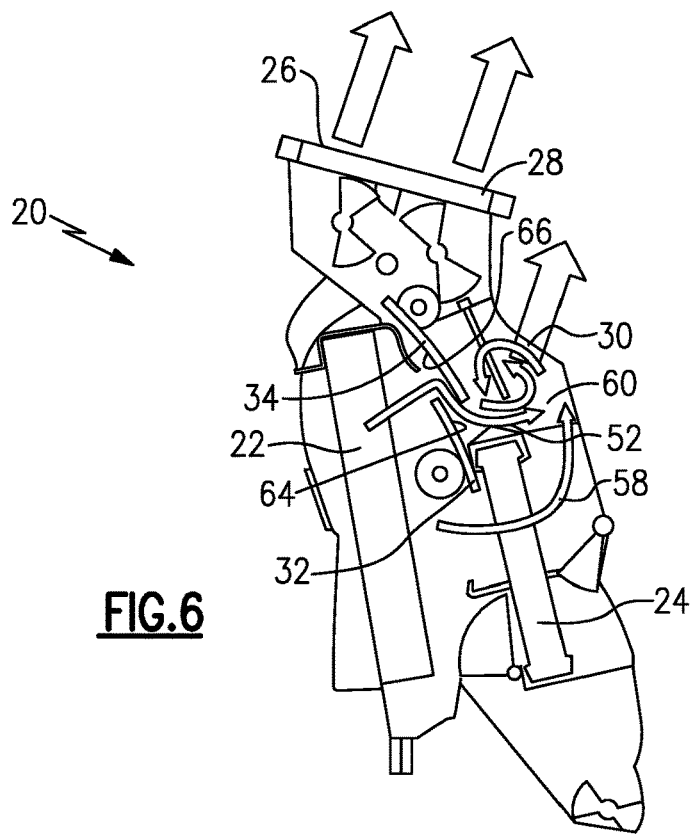
FIG. 6 schematically illustrates the example HVAC system in an intermediary temperature position.

FIG. 6 schematically illustrates the HVAC system 20 with its temperature control door 32 and stratification door 34 at an intermediary temperature position. The stratification door 34 is downstream of the control door 32 and positioned such that it forces the airflow that bypasses the heater 24 to be mixed with the heated air before flowing to the outlets 34, 36. Specifically, air flowing through the bypass path flows between the control door 32 and stratification door 34 and toward a lower portion of a bypass cavity 60 (with respect to the orientation shown in the Figure). In some examples, as shown, the air flowing through the bypass path 52 flows between the convex surface 64 of the control door 32 and the concave surface 66 of the stratification door 34 and toward a lower portion of a bypass cavity 60. Air flowing across the heated path flows upward into the bypass cavity 60 and a swirling is created within the bypass cavity to evenly mix the heated and bypass air before the air exits through the outlets 26, 28, 30. The stratification door 34 therefore enhances mixing of the conditioned air before distribution to the outlets 26, 28, 30 without requiring significant additional packaging space. The stratification door 34 adds air flow restriction to the bypass path when the system 20 is in an intermediary temperature position to balance the air flow restriction of the heated path. The stratification door 34 creates a more linear temperature response characteristic relative to the motion of the temperature control door 32.

In some examples the doors 32, 34 are geared to move in unison, such as in opposite directions in some examples. In some examples, the doors 32, 34 are independently controllable.

Figure 7:
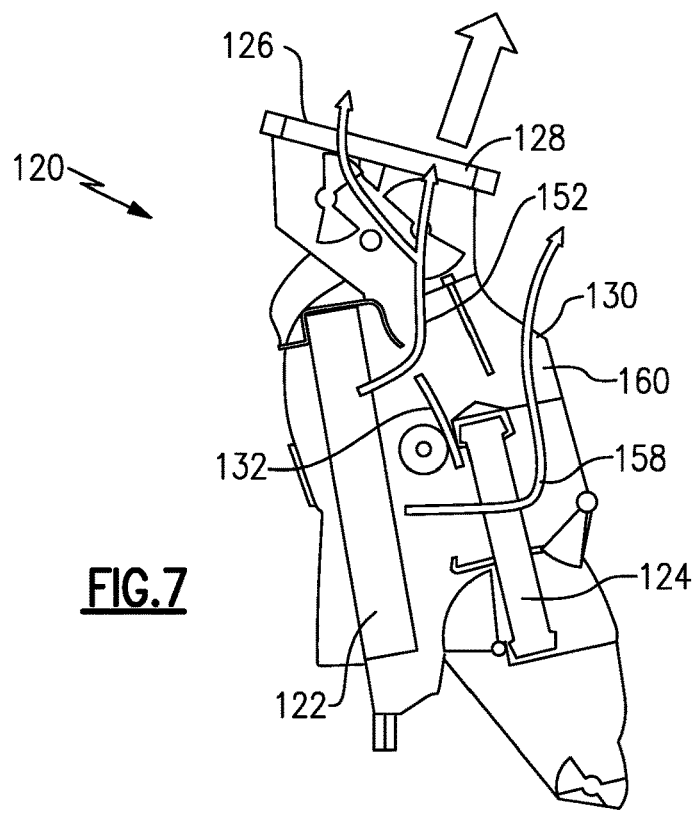
FIG. 7 schematically illustrates another example HVAC system without a stratification door and in an intermediary temperature position.

For reference, FIG. 7 shows an HVAC system 120 similar to HVAC system 20 but without a stratification door and with a temperature control door 132 at an intermediate position. As shown schematically, airflow through the bypass path 152 may not mix as well within the cavity 160 with airflow through the heated path 158, resulting in the conditioned air flowing out of the outlets 126, 128 being colder than the conditioned air flowing out of the outlet 130. The conditioned air flowing out of the outlet 130 is mostly air that flowed across the heater 124, while the conditioned air flowing out of the outlets 126, 128 is mostly air that bypassed the heater 124.

Referring back to FIG. 6, in the HVAC system 20, the outlet 26, 28, 30 temperature is a more linear function of control door 32 position than in the embodiment shown in FIG. 7. The outlet temperature at individual outlets when the system 20 is in an intermediary temperature position is a comfortable blend of hot and cold, such that each outlet can achieve a "target" air temperature.

Further, in the HVAC system 20, it is possible to configure the stratification door 34 so that the user can adjust the upper air temperature (vent or defrost outlets) independent of the lower air temperature (floor outlets) by having the doors 32, 34 independently controllable in some examples.

Figure 11:
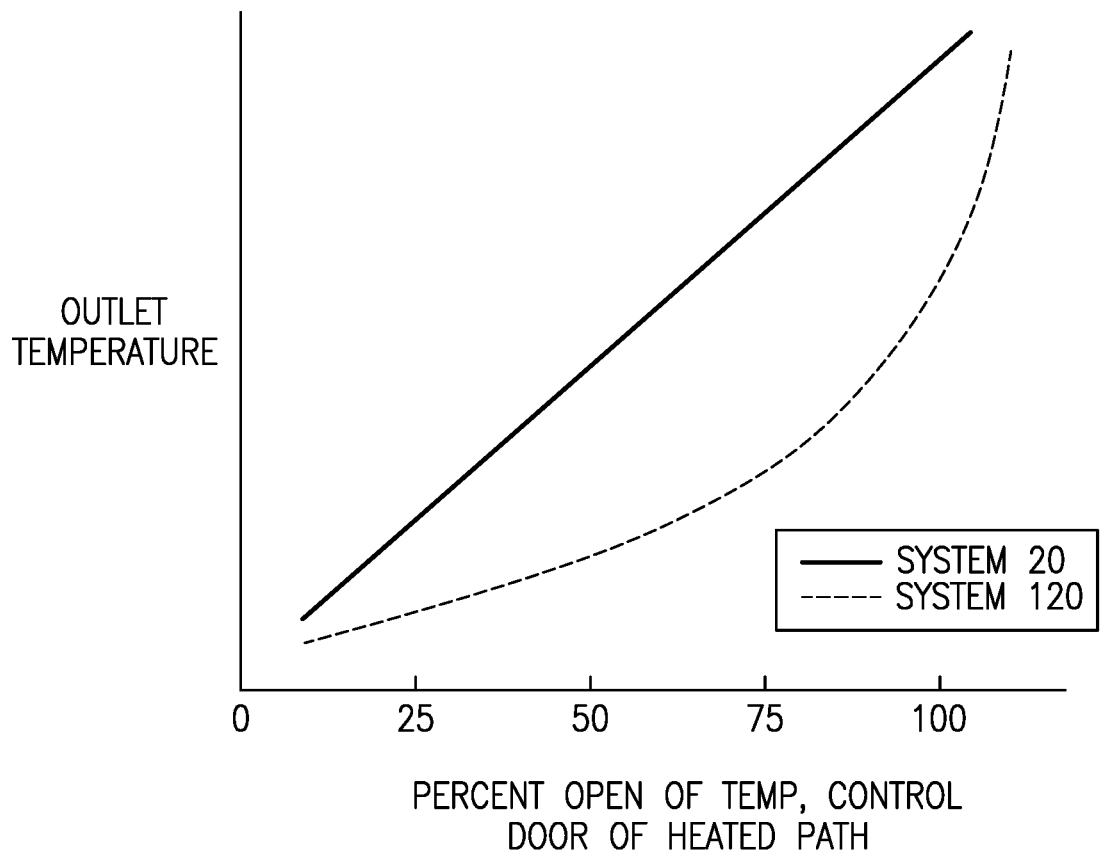
FIG. 11 graphically illustrates the relationship of the outlet temperature against the position of the temperature control door for the example systems.

FIG. 11 illustrates a graphical representation of the linear relationship described above. The outlet temperature (y-axis) is a more linear function of the position of the temperature control door (x-axis) in the system 20 than in the system 120.

Figure 8:
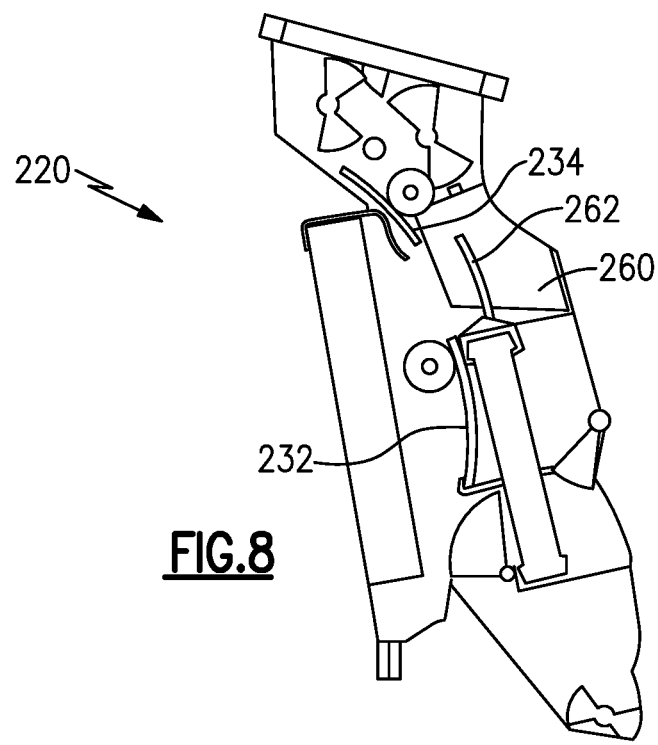
FIG. 8 schematically illustrates a third example HVAC system.

As shown in FIG. 8, in some examples, an example system 220 may include a tuning wall 262 located downstream of the stratification door 234 provided within the bypass cavity 260 for tuning. The tuning wall 262 may be configured in a number of ways to control the direction of airflow to achieve desired outlet temperatures.

Figure 9:
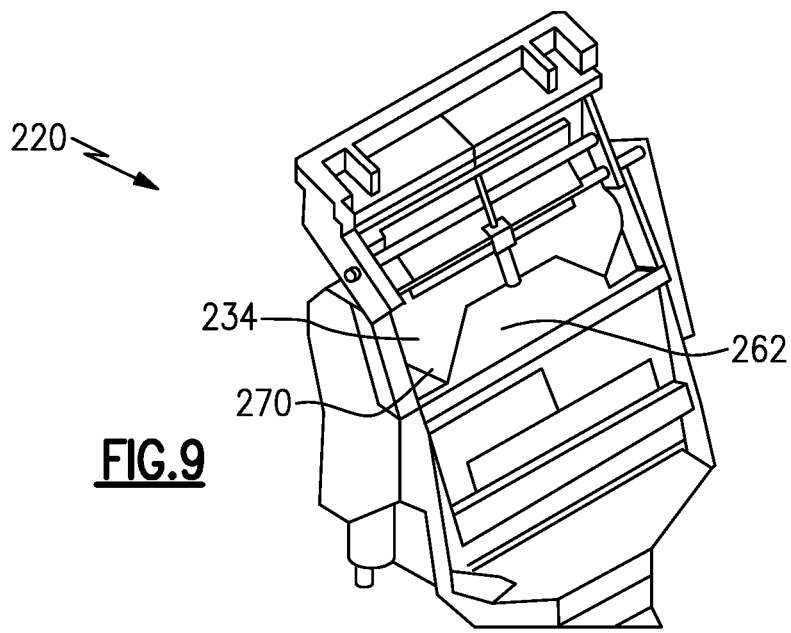
FIG. 9 illustrates an isometric view of the example HVAC system shown in FIG. 8.

As shown in FIG. 9, the stratification door 234 may have openings or cut-outs 270 for tuning airflow to allow for further control of hot and cold mixing. Although exemplary geometries are shown, other geometries are contemplated.

It should be understood that like reference numerals identify corresponding or similar elements throughout the several drawings. It should be understood that although a particular component arrangement is disclosed and illustrated in these exemplary examples, other arrangements could also benefit from the teachings of this disclosure.

The foregoing description shall be interpreted as illustrative. A worker of ordinary skill in the art would understand that certain modifications could come within the scope of this disclosure. Various examples of the disclosure have been described. Any combination of the described systems, operations, or functions is contemplated. It is possible to use some of the components or features from any of the examples in combination with features or components from any of the other examples. These and other examples are within the scope of the following claims.

What is claimed is:
1. An HVAC system, comprising:
an evaporator;
a heater;
a plurality of outlets;
a sliding control door downstream of the evaporator and configured to allow air to flow across one or both of a heated path across the heater and a bypass path bypassing the heater; and
a sliding stratification door downstream of the control door and positionable to, in an intermediate position, direct the air flowing through the bypass path to be mixed with air that flowed across the heated path before flowing out of the plurality of outlets;
wherein the air is mixed within a bypass cavity; in a full cold position, the stratification door is in a retracted position within an upper exit cavity to unobstruct the bypass path; and the plurality of outlets includes a defrost outlet and an upper vent outlet, and the upper exit cavity is provided fluidly between the bypass cavity and the defrost outlet and upper vent outlet.

2. The system as recited in claim 1, wherein, when the stratification door is in the retracted position, a maximum distance between a surface of the stratification door and an interfacing inner surface of the upper exit cavity is 0-50 mm.

3. The system as recited in claim 1, wherein, in a full hot position, the control door is positioned to block the bypass path, such that airflow must flow across the heater before entering the bypass cavity.

4. The system as recited in claim 1, wherein the stratification door includes a concave surface that faces the evaporator.

5. The system as recited in claim 4, wherein the stratification door is a rack and pinion style sliding door.

6. The system as recited in claim 1, wherein the control door is a rack and pinion style door.

7. The system as recited in claim 6, wherein a pinion portion of the control door is between the evaporator and the heater.

8. The system as recited in claim 7, wherein the pinion portion of the control door is between the heated path and the bypass path.

9. The system as recited in claim 8, wherein the control door includes a concave surface that faces the evaporator.

10. The system as recited in claim 1, wherein, in the intermediate position, the air flowing across the bypass path flows between the control door and the stratification door and toward a lower portion of a bypass cavity, where the air is then mixed with the air that flowed across the heated path.

11. An HVAC system, comprising:
 an evaporator;
 a heater;
 a plurality of outlets;
 a sliding control door downstream of the evaporator and configured to allow air to flow across one or both of a heated path across the heater and a bypass path bypassing the heater; and
 a sliding stratification door downstream of the control door and positionable to, in an intermediate position, direct the air flowing through the bypass path to be mixed with air that flowed across the heated path before flowing out of the plurality of outlets;
 wherein, in the intermediate position, the air flowing across the bypass path flows between a convex surface of the control door and a concave surface of the stratification door and toward a lower portion of a bypass cavity, where the air is then mixed with the air that flowed across the heated path.

12. The system as recited in claim 11, wherein the stratification door is a rack and pinion style sliding door.

13. The system as recited in claim 11, wherein the control door is a rack and pinion style door.

14. The system as recited in claim 13, wherein a pinion portion of the control door is between the evaporator and the heater.

15. An HVAC system, comprising:
 an evaporator:
 a heater;
 a plurality of outlets;
 a sliding control door downstream of the evaporator and configured to allow air to flow across one or both of a heated path across the heater and a bypass path bypassing the heater; and
 a sliding stratification door downstream of the control door and positionable to, in an intermediate position, direct the air flowing through the bypass path to be mixed within a bypass cavity with the air that flowed across the heated path before flowing out of the plurality of outlets;
 wherein,
  in a full cold position, the stratification door is in a retracted position within an upper exit cavity to unobstruct the bypass path;
  the plurality of outlets includes a defrost outlet and an upper vent outlet;
  the upper exit cavity is provided fluidly between the bypass cavity and the defrost outlet and upper vent outlet;
  when the stratification door is in the retracted position, a maximum distance between a surface of the stratification door and an interfacing inner surface of the upper exit cavity is 0-50 mm; and
  in the intermediate position, air flowing across the bypass path flows between a convex surface of the control door and a concave surface of the stratification door and toward a lower portion of a bypass cavity, where the air is then mixed with the air that flowed across the heated path.

16. The system as recited in claim 15, wherein the stratification door is a rack and pinion style sliding door.

17. The system as recited in claim 15, wherein the control door is a rack and pinion style door.

18. The system as recited in claim 17, wherein a pinion portion of the control door is between the evaporator and the heater.

19. The system as recited in claim 18, wherein the pinion portion of the control door is between the heated path and the bypass path.

20. The system as recited in claim 19, wherein the control door includes a concave surface that faces the evaporator.

* * * * *